United States Patent
Krishnamurthy et al.

(10) Patent No.: US 10,963,162 B2
(45) Date of Patent: Mar. 30, 2021

(54) ENABLING PARALLEL IO'S WITH PARTIAL CHECKSUM ON IMBRICATED JOURNAL SLOTS

(71) Applicant: VMWARE, INC., Palo Alto, CA (US)

(72) Inventors: Pradeep Krishnamurthy, Bangalore (IN); Srikanth Mahabalarao, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 193 days.

(21) Appl. No.: 16/268,517

(22) Filed: Feb. 6, 2019

(65) Prior Publication Data

US 2020/0117358 A1 Apr. 16, 2020

(30) Foreign Application Priority Data

Oct. 10, 2018 (IN) .............................. 201841038477

(51) Int. Cl.
 *G06F 12/00* (2006.01)
 *G06F 3/06* (2006.01)

(52) U.S. Cl.
 CPC .............. *G06F 3/061* (2013.01); *G06F 3/067* (2013.01); *G06F 3/0655* (2013.01)

(58) Field of Classification Search
 CPC ........ G06F 3/061; G06F 3/067; G06F 3/0655; G06F 3/0659; G06F 3/0611; G06F 3/0671; G06F 3/0619
 USPC ......................................................... 711/154
 See application file for complete search history.

(56) References Cited

U.S. PATENT DOCUMENTS

| | | | |
|---|---|---|---|
| 9,020,987 B1* | 4/2015 | Nanda ................. | G06F 16/1734 707/821 |
| 2014/0006362 A1* | 1/2014 | Noronha ............... | G06F 3/0689 707/692 |
| 2017/0277715 A1* | 9/2017 | Strauss ............... | G06F 16/1865 |

OTHER PUBLICATIONS

"Journaling file system"; https://en.wikipedia.org/wiki/Journaling_file_system.
"Journaling File System & Its 2 types"; https://foxutech.com/journaling-filesystem.
Prabhakaran et al., "Analysis and Evolution of Journaling File Systems", Computer Sciences Department University of Wisconsin, Madison, USENIX Association, 2005 USENIX Annual Technical Conference, pp. 105-120.

* cited by examiner

*Primary Examiner* — Mardochee Chery
(74) *Attorney, Agent, or Firm* — Patterson + Sheridan, LLP

(57) ABSTRACT

The disclosure provides an approach for performing a write to a storage system, the write having reduced latency due to parallelism of sub-steps of the write, and due to calculating a partial rather than a full checksum. The mechanism of the write has low file corruption of files on the storage system, due to journaling of the checksum.

20 Claims, 8 Drawing Sheets

US 10,963,162 B2

ENABLING PARALLEL IO'S WITH PARTIAL CHECKSUM ON IMBRICATED JOURNAL SLOTS

RELATED APPLICATIONS

Benefit is claimed under 35 U.S.C. 119(a)-(d) to Foreign Application Serial No. 201841038477 filed in India entitled "ENABLING PARALLEL IO'S WITH PARTIAL CHECKSUM ON IMBRICATED JOURNAL SLOTS", on Oct. 10, 2018, by VMware, Inc., which is herein incorporated in its entirety by reference for all purposes.

BACKGROUND

Computing devices write data to storage. The process of writing data to storage does not occur atomically, but rather, in several steps. For example, the steps of writing data to a file may include updating file metadata within the file index node (inode), updating file metadata within the file pointer blocks, and writing data to storage blocks associated with the file. The lack of atomicity in writing data to storage creates issues with storage systems.

If a system crash occurs during the write process, a file on the storage can become corrupted. Systems exist to guard against file corruption. In one system, both file metadata and file data are written to a journal. Then, metadata and file data are written to storage, one after the other. If a system crash occurs during writing, the metadata and file data are rewritten to storage after the crash. In this system, the chance of file corruption is removed, but the latency of a write is high because each write to storage requires an additional write to a journal.

In a second system, file metadata is journaled before a write of data to storage. If a crash occurs after file metadata is journaled but before the data is written, then after the crash, the file becomes corrupted because the metadata is written to storage but the data relating to the metadata has not been written. This second system has lower latency, but the chance of file corruption is high.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for performing a write to a storage system, the write having reduced latency due to parallelism of sub-steps of the write, and due to calculating a partial rather than a full checksum. The mechanism of the write has a low probability of file corruption of files on the storage system, due to journaling of the checksum.

Figure 1:
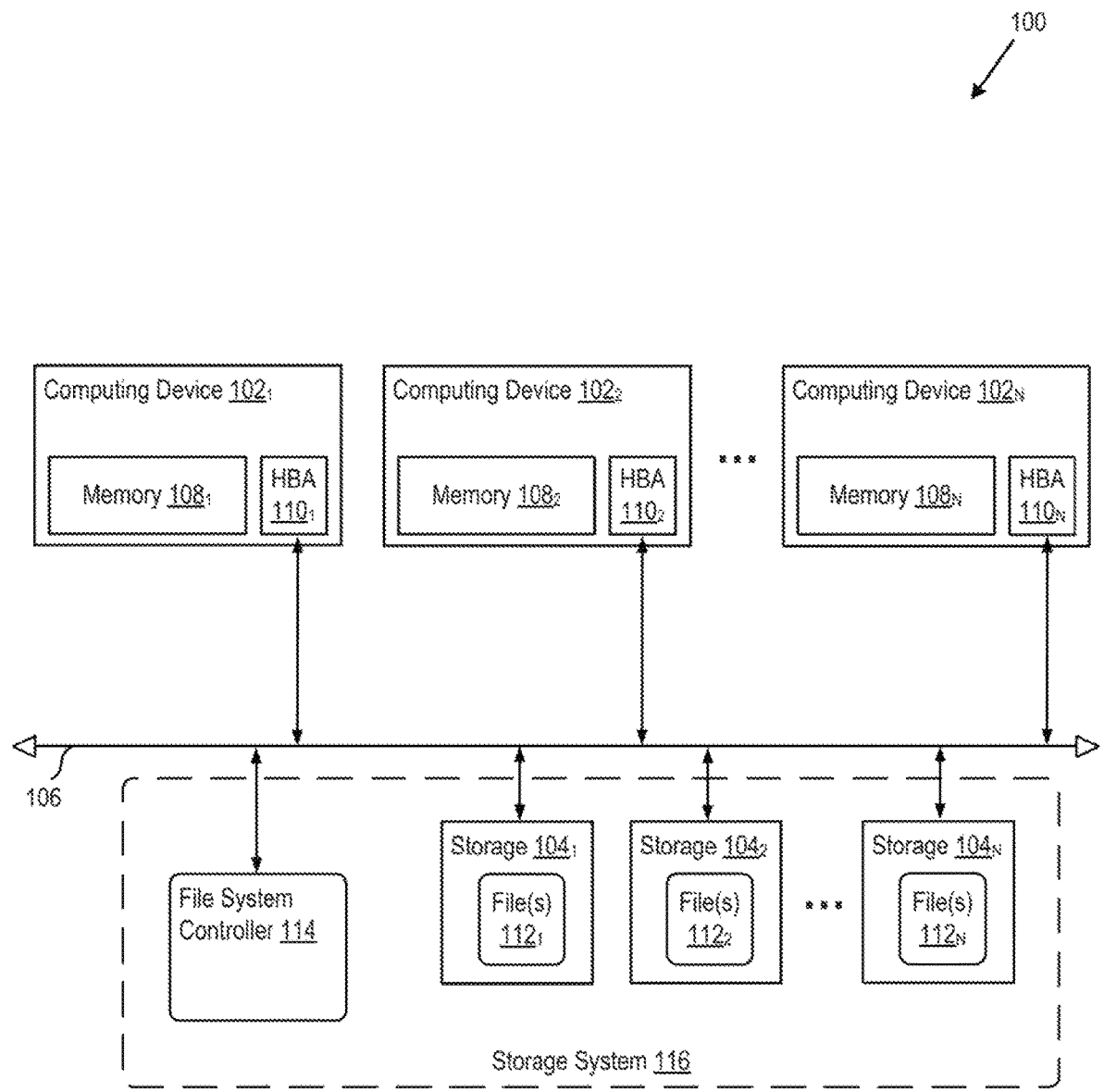
FIG. 1 depicts a block diagram of a storage system in which one or more embodiments of the present invention may be implemented.

FIG. 1 depicts a block diagram of a computing system 100 in which one or more embodiments of the present invention may be implemented. Computing system 100 comprises one or more computing devices $102_1$ to $102_N$ (collectively referred to as computing devices 102 and individually referred to as computing device 102), a storage system 116, a network 106 connecting computing devices 102 and storage system 116. Network 106 may be, for example, a storage area network (SAN), a direct link, a local area network (LAN), a wide area network (WAN) such as the Internet, another type of network, or a combination of these.

Computing device 102 is a physical device. Computing device 102 may be constructed on a server grade hardware platform 106, such as an x86 architecture platform. Computing devices 102 may be geographically co-located servers on the same rack. Computing device 102 may be configured to provide a virtualization layer, also referred to as a hypervisor, that abstracts processor, memory, storage, and networking resources of a hardware platform into multiple virtual computing instances (e.g., virtual machines, containers, etc.). Accordingly, certain functions described herein as being performed by computing device 102 may be performed by one or more virtual computing instances running on computing device 102. Computing device 102 may include components such as system memory 108, a host bus adapter (HBA) 110, and other components that are not shown in FIG. 1, such as processors (CPUs), a network interface card (NIC), and I/O devices such as a mouse and keyboard.

HBA 110 couples computing device 102 to one or more external storages 104. Although storage 104 is shown in FIG. 1 as being external to computing device 102, connected through HBA 110 of computing device 102, storage 104 may be located within computing device 102, or may be network-attached storage (NAS) accessible via a NIC (not shown) of computing device 102. Storage 104 contains one or more files 112. An exemplary file 112 is described with reference to FIG. 2, below. Storage 104 may be a persistent storage device (e.g., one or more hard disks, flash memory modules, solid state disks, persistent non-volatile memory, and/or optical disks). An exemplary embodiment of storage 104 is described with reference to FIG. 3, below.

Memory 108 is hardware allowing information, such as executable instructions, configurations, and other data, to be stored and retrieved. Memory 108 is where programs and data are kept when a processor of computing device 102 is actively using the programs or data. Memory 108 may be volatile memory. Volatile or non-persistent memory is memory that needs constant power in order to prevent data from being erased. Volatile memory may be, for example, dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory. In an embodiment, persistent non-volatile memory 108 may serve the functions of both memory 102 and storage 104.

Storage system 116 comprises one or more storage devices $104_1$ to $104_N$ (collectively referred to as storages 104 and individually referred to as storage 104) and a file system controller 114. File system controller 114 is a software service that controls how data is organized, stored and retrieved within storage system 116. File system controller 114 may be a virtual computing instance or a cluster of virtual computing instances running within one or more computing devices 102. File system controller 114 may be one of computing devices 102, or file system controller 114 may be a separate computing device (not shown). File system controller 114 controls a file system (not shown) implemented throughout computing system 100. Examples of file systems include network file system (NFS), Andrew file system (AFS), and Virtual Machine File System (VMFS).

Each computing device may comprise a storage system driver (not shown) that sends requests to file system controller 114, through HBA 110. The requests may be, for example, create, read, update, and delete (CRUD) requests, and/or "unmap" and "trim" requests. File system controller 114 handles the requests by directing them to one or more storages 104.

Figure 2:
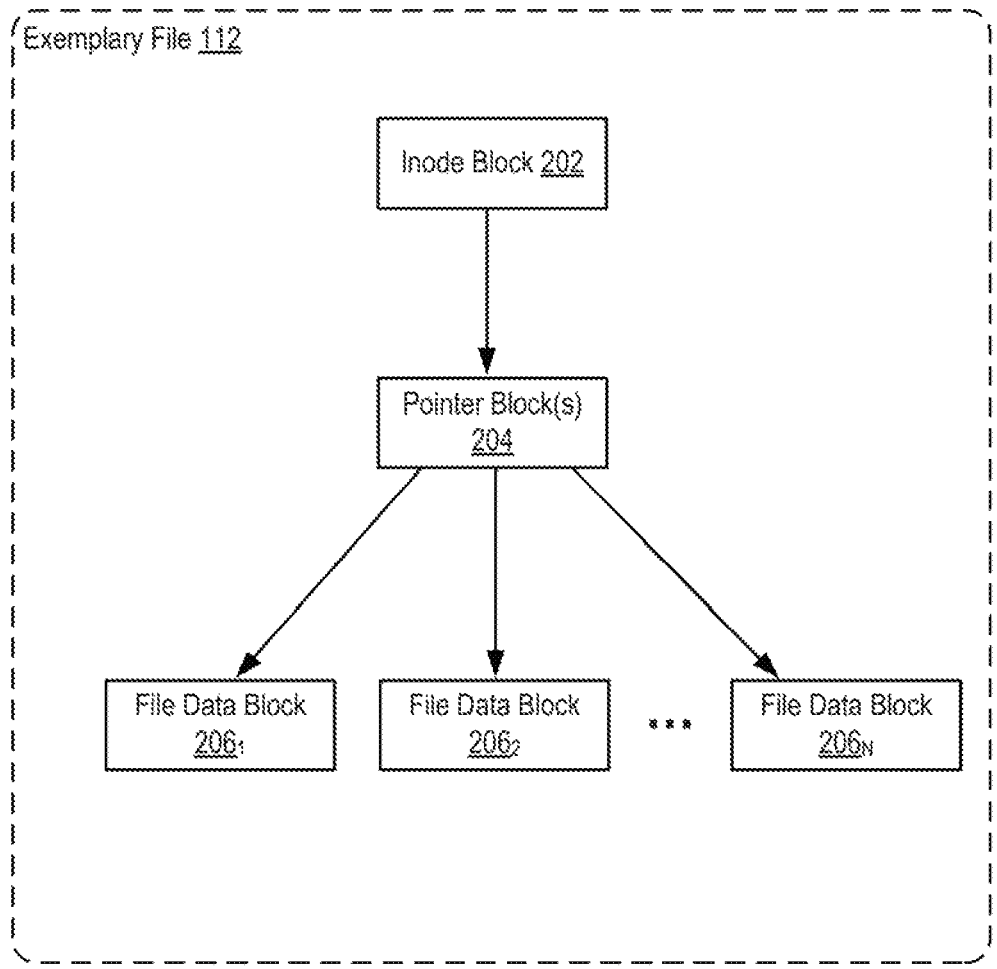
FIG. 2 depicts a block diagram of an exemplary file, according to an embodiment.

FIG. 2 depicts a block diagram of an exemplary file 112, according to an embodiment. File 112 comprises an Mode block 202, one or more pointer blocks 204, and one or more file data blocks 206. iNode block 202 is a block of storage 104 or a data object located within a block of storage 104. Inode block 202 is a root of file 112. Inode block 202 stores metadata of file 112. The metadata stored by Mode block 202 may include the size of a file and one or more addresses within storage 104. The metadata stored by Mode block 202 may also include information such as file ownership, access mode (read, write, execute permissions for various users), file type, file size, and the like. The addresses within Mode block 202 function as pointers to pointer blocks 204. The addresses may be logical or physical addresses, and if the addresses are logical, then the logical addresses may be translated to physical addresses by file system controller 114. Although FIG. 1 shows Mode block 202 as pointing to a single pointer block 204, Mode block 202 may point to multiple pointer blocks 204 of file 112.

A pointer block 204 is a block of storage 104 or a data object located within a block of storage 104. Pointer block 204 contains one or more addresses within storage 104. The addresses within pointer block 204 function as pointers to file data blocks 206. Although FIG. 2 shows pointer blocks 204 as pointing to file data blocks 206, file 112 may contain several levels of pointers blocks 204, such that a pointer block 204 points to another pointer block 204, which points to a file data block 206 or to another pointer block 204. A block within storage 104 (e.g., block containing Mode block 202, pointer block 204, or file data block 206) may be, for example, 4 KB, 16 KB, 1 MB, or 32 MB in size.

File data blocks 206 contain data of file 112, while inode 202 and pointer blocks 204 contain metadata of file 112. As used herein, "data" of file 112 is the data that an application or operating system running on computing device 102 may utilize directly. For example, an application request (e.g., read/write) for data may be formed (e.g., by the application) as an I/O command, which is converted to a file system operation (e.g., by an I/O layer implemented in the operating system) and sent to a file system driver within computing device 102. The file system driver may then issue commands (e.g., raw SCSI/SATA commands) to read/write to storage 104 in data blocks 206.

As used herein, "metadata" of file 112 is data that describes aspects of the data written, being written, or to be written to file data blocks 206 of storage 104. As used herein, "data" of file 112 includes information stored within file data block(s) 206 of file 112, and does not typically include information stored within inode block 202 of file 112 and information stored within pointer block(s) 204 of file 112. As used herein, "metadata" of file 112 includes information that is stored or that will be stored within inode block 202 of file 112 and within pointer block(s) 204 of file 112. The term "metadata" may also include information stored within slot 310 of journal 308 (see FIGS. 3 and 5A), this information being information on which metadata within inode block 202 and pointer block 204 is based. In an embodiment, "metadata" does not typically include information stored within file data block(s) 206 of file 112. "Metadata" may also include a checksum of the data written, being written, or to be written to file data blocks 206 of storage 104. For example, a file may be an ebook. The data of the ebook file may be the contents of the ebook. The metadata of the ebook file may include, for example, the file size, creation date, and storage location(s) within storage 104 of the ebook file.

Figure 3:
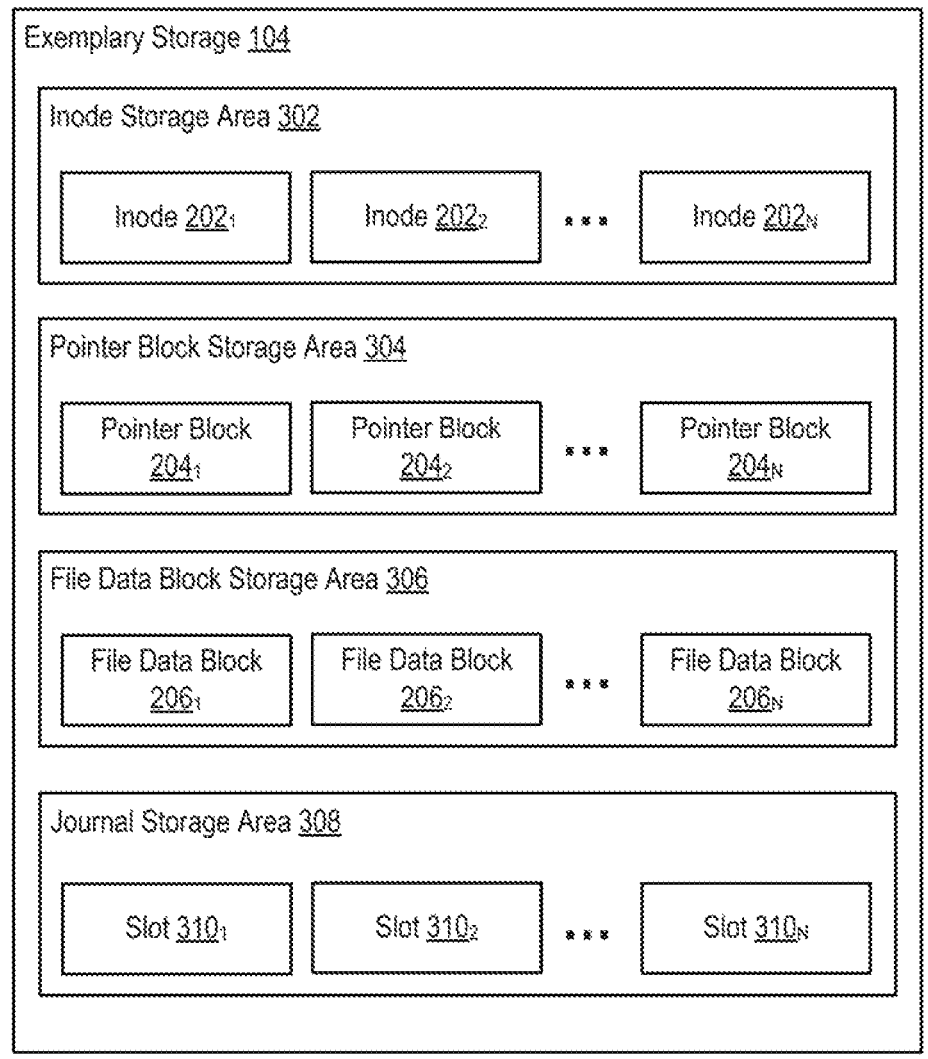
FIG. 3 depicts a block diagram of exemplary organization of storage, according to an embodiment.

FIG. 3 depicts a block diagram of exemplary organization of storage 104, according to an embodiment. Storage 104 may be organized into several areas, such as inode storage area 302, pointer block storage area 304, file data block storage area 306, and a journal storage area 308. Inode storage area 302 is an area of storage 104 containing inode blocks 202. Pointer block storage area 304 is an area of storage 104 containing pointer blocks 204. File data block storage area 306 is an area of storage 104 containing file data blocks 206. In an embodiment, each area of storage 104 shown in FIG. 3 is composed of linear, contiguous block of storage 104. In a second embodiment, each area of storage 104 is composed of storage blocks that may be arbitrarily or randomly located within storage 104, and the blocks are organized into logical "areas" through a data structure that keeps track of what blocks of storage 104 belong to what area.

Journal storage area 308 or journal 308 is an area of storage 104 that is used for temporarily storing some or all metadata of file 112 before that metadata is written to inode block(s) 202 and/or pointer block(s) 204 of file 112. Journal 308 is also used to temporarily store a checksum of data written, being written, or to be written to file data block(s) 206 of file data block storage area 306. A checksum is a datum derived from other data for the purpose of detecting errors which may have been introduced during transmission or storage of the other data. A checksum is used to verify integrity of that other data. A checksum may be computed using a checksum algorithm such as parity byte, modular sum, position dependent, or another algorithm.

Journal 308 may be divided into several slots 310. Each slot may be, for example, 16 bytes, 32 bytes, 4 KB, 32 KB, 1 MB, 2 MB, or 4 MB. In an embodiment, slots 310 are arranged in a linear, contiguous manner. In a second embodiment, slots 310 are arranged arbitrarily or randomly within storage 104, and slots 310 are organized into a sequence through a data structure that keeps track of the location and order of slots 310 within journal 308. Journal 308 is further described with reference to FIG. 5A and FIG. 5B, below.

Figure 4:
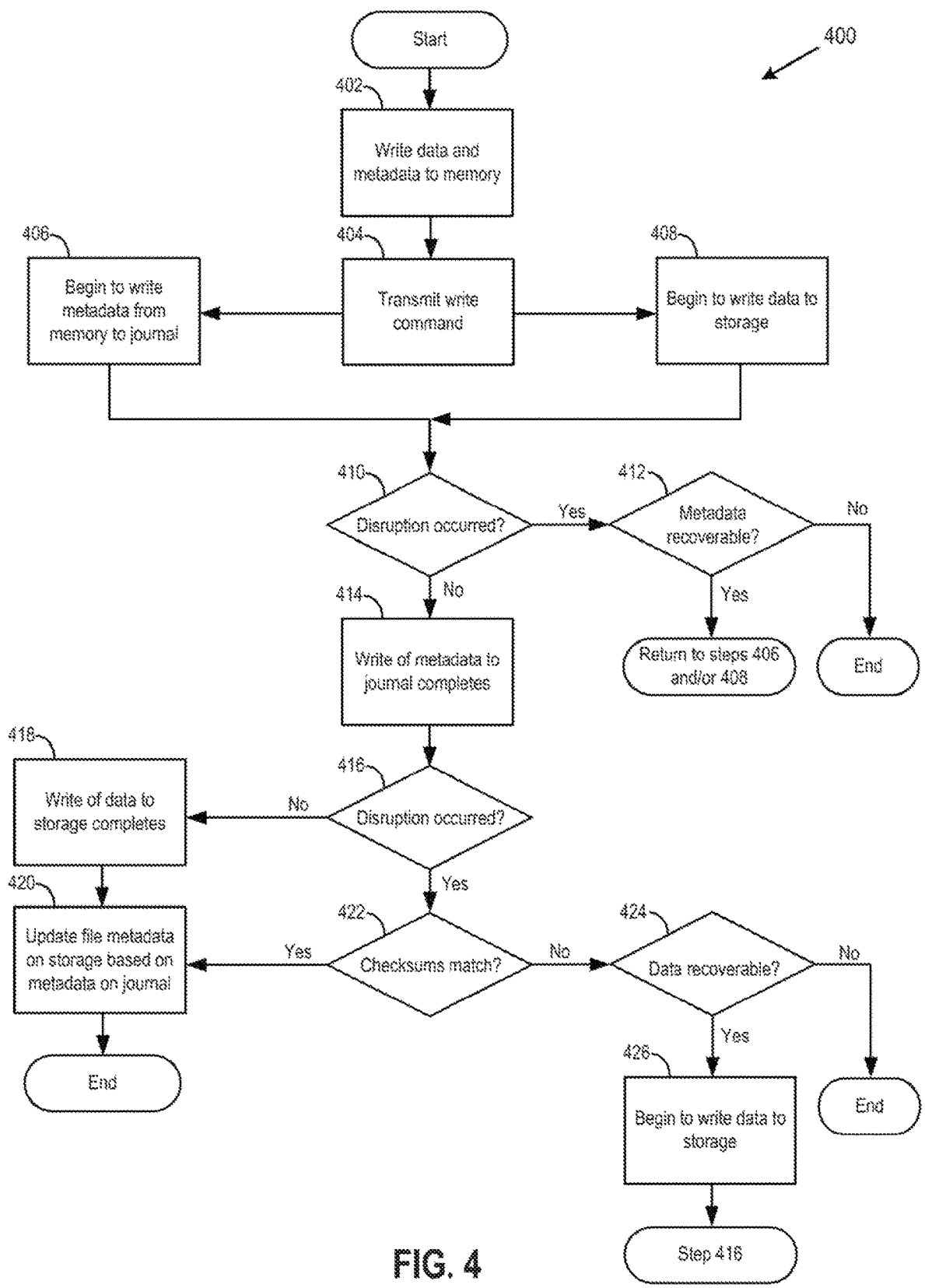
FIG. 4 depicts a flow diagram of a method of performing a write to storage, according to an embodiment.
Figure 5A:
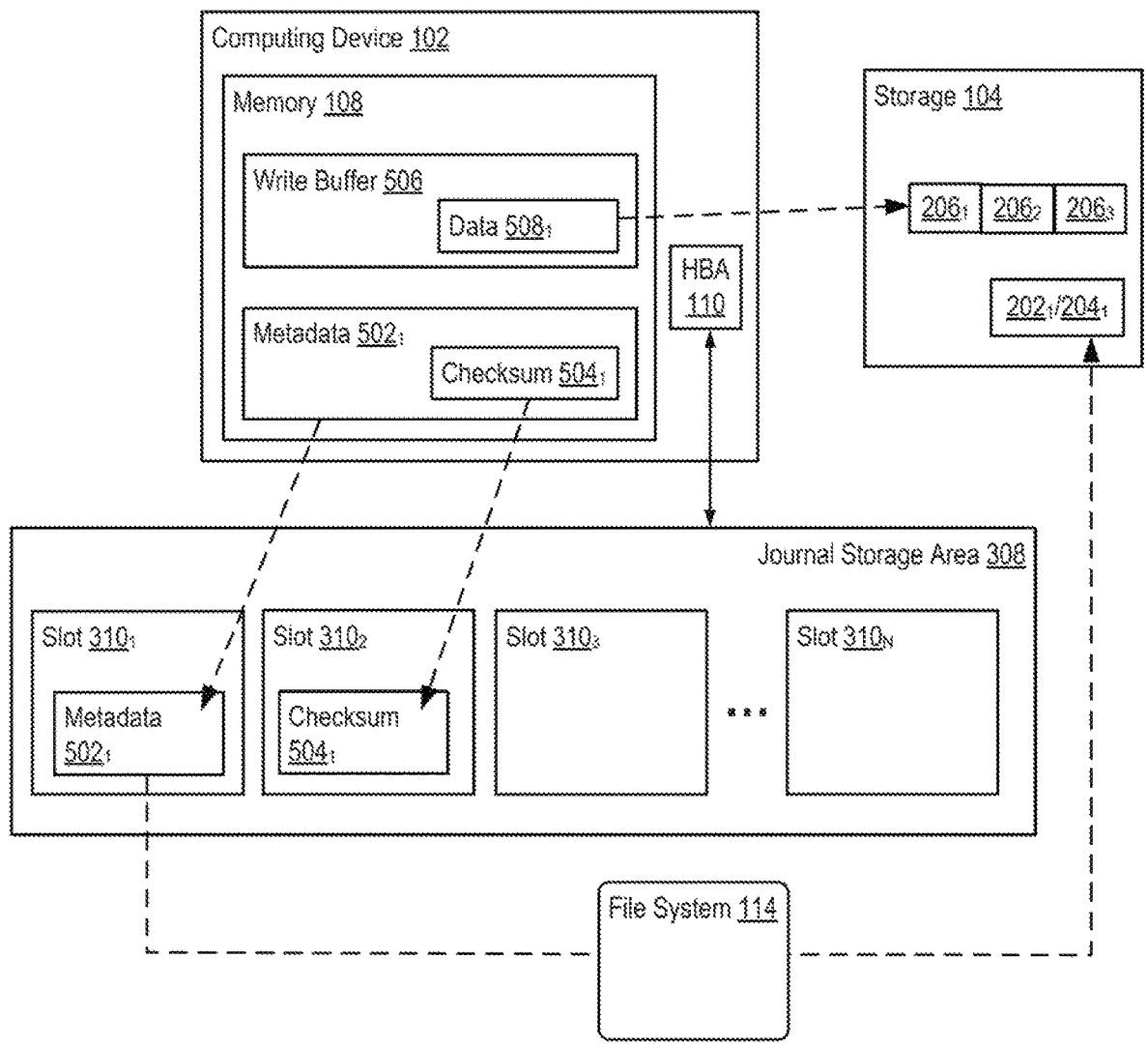
FIG. 5A depicts a block diagram of a flow of data and metadata of a first write to storage, according to an embodiment.

FIG. 4 depicts a flow diagram of a method 400 of performing a write to storage 104, according to an embodiment. Method 400 is described along with FIG. 5A, in order to illustrate the steps of method 400. FIG. 5A depicts a block diagram of a flow of data and metadata of a first write to storage 104, according to an embodiment. Method 400 may be triggered when computing device 102 determines that data $508_1$ (see FIG. 5A) is to be written to storage 104.

At step 402, computing device 102 writes data $508_1$ that is to be written to storage 104 into a write buffer 506 located within memory 108 of computing device 102. Also at step 402, computing device 102 writes metadata $502_1$ about data $508_1$ to memory 108. In this example, computing device 102 is writing data to file 112 located within storage 104. Metadata $502_1$ may include a mapping between (a) an offset within file 112, and (b) file data block 206 within storage 104 to which data $508_1$ is to be written. File system controller 114 uses the mapping to determine which data blocks 206 are to hold data $508_1$. Metadata $502_1$ includes a checksum of data $508_1$, and may also include a size indicator of data $508_1$. File system controller 114 uses the size indicator to determine which portions of file data blocks 206 are to hold data $50_18$. In an embodiment, the size indicator may be a multiplier, such that the size of data $508_1$ is a multiple of a base size. The base size may be maintained by file system controller 114. As part of step 402, computing device 102 calculates a checksum $504_1$ of data $508_1$ or of a portion of data $508_1$. The checksum $504_1$ may be calculated while data $508_1$ is being written to memory 108, after data $508_1$ has completed being written to memory 108 but before data $508_1$ has began transmission from memory 108 to storage 104 (see step 408), or while data $508_1$ is being transmitted from memory 108 to storage 104 (see step 408). Metadata $502_1$ may include the checksum $504_1$ of data $508_1$ or of a portion of data $508_1$. Checksum $504_1$ is further described below with reference to FIG. 6 and FIG. 7.

For example, file 112 may be a word processing file, and computing device 102 may be adding a page of text to the word processing file. Word processing file 112 may comprise Mode block $202_1$, pointer block $204_1$, and file data blocks $206_1$, $206_2$, and $206_3$. In this example, data $508_1$ is the page of text that is to be added to word processing file 112. Metadata $502_1$ of exemplary word processing file 112 includes an offset within file 112, and that offset is the end of the file, because data is being added to the end of the file. Metadata $502_1$ might include an address of a file data block $206_1$ to which data $508_1$ is to be written, and that file data block 206 may be mapped to the offset of file 112. Because new data is being added to file 112 without replacing previous data of file 112, the file data block indicated within metadata $502_1$ may be $206_3$, which is the last file data block holding data of file 112. Because one or more file data blocks 206 may need to be added to file 112 as a result of write of data $508_1$, metadata $502_1$ may contain an indicator that one or more new file data blocks 206 are to be allocated by file system controller 114 for the writing of data $508_1$ to those file data blocks. Metadata $502_1$ may include a size indicator, such as "8 KB" indicating the size of data $508_1$. Alternatively, the size indicator could be a multiplier, such as "2" indicating that a base size of "4 KB" is to be multiplied by 2 in order to obtain the 8 KB size of data $508_1$. The base size of 4 KB may be maintained by file system controller 114. Metadata $502_1$ may include checksum $504_1$ of data $508_1$.

At step 404, computing device 102 transmits a command to file system controller 114, the command requesting file system controller 114 to write data $508_1$ to storage 104. The command may include an indicator of a location within memory 108 where data $508_1$ is located, and the command may include an indicator of a location within memory 108 where metadata $502_1$ is located. As part of step 404, file system controller 114 receives the command and begins the write operation. The write operation includes a parallel execution of steps 406 and 408 by file system controller 114. After step 404, method 400 continues to steps 406 and 408, and file system controller 114 executes steps 406 and 408 at the same time.

At step 406, file system controller 114 begins to write metadata $502_1$ to one of slots 310 within journal 308, such as slot $310_1$. In an embodiment, metadata $502_1$ written to slot $310_1$ does not include checksum $504_1$. Rather, file system controller 114 writes checksum $504_1$ to another slot 310, such as slot $310_2$, that is positioned immediately subsequent or adjacent to slot $310_1$ to which metadata $502_1$ is written, as shown in FIG. 5A. In an embodiment, file system controller 114 writes metadata $502_1$ (excluding checksum 504) to slot $310_1$ in sequence with the writing of checksum $504_1$ to slot $310_2$. In another embodiment, file system controller 114 writes metadata $502_1$ (excluding checksum $504_1$) to slot $310_1$ in parallel with the writing of checksum $504_1$ to slot $310_2$.

An "active" slot 310 of journal 308 is chosen for writing of metadata $502_1$ to journal 308. In a first embodiment, the slot 310 designated as active may rotate in a round robin fashion, starting with slot $310_1$, continuing to slot 310N, and then returning to slot $310_1$. The "active" slot 310 may shift after each successfully completed write operation to storage 104. In a second embodiment, the active slot begins at slot $310_1$ and shifts one slot at every write operation, and once all slots 310 of journal 308 have been filled with metadata 502 and/or checksum 504, contents of slots 310 are cleared and the active slots returns to slot $310_1$. For the purpose of illustrating method 400, metadata $502_1$ is written to slot $310_1$ and checksum $504_1$ is written to slot $310_2$, as shown in FIG. 5A.

At step 408, file system controller 114 begins to write data $508_1$ to one or more file data blocks 206 of storage 104, such as file data blocks $206_{1-3}$. During the parallel writing of (a) data $508_1$ to file data block storage area 306, and (b) metadata $502_1$ to journal storage area 308, a disruption may occur. The disruption may be, for example, a disconnected connection within network 106 that prevents transmission across network 106. The disruption may be a system crash of computing device 102, which may wipe memory 108, deleting data $508_1$ and metadata $502_1$ from memory 108.

At step 410, file system controller 114 determines whether a disruption has occurred. If a disruption has occurred, method 400 continues to step 412. If a disruption has not occurred, method 400 continues to step 414.

At step 412, file system controller 114 determines whether metadata $502_1$, including checksum $504_1$, is recoverable despite the disruption of step 410. File system controller 114 may determine whether metadata $502_1$ is recoverable by, for example, determining whether the disruption of step 410 has erased memory 108. If the disruption did not erase memory 108, then file system controller 114 can begin the write process over again, repeating step 406 and/or 408 until both steps successfully complete. If the disruption deleted memory 108 before metadata $502_1$ and checksum $504_1$ have finished writing from memory 108 to journal 308, then the write operation that began at step 402 is lost and method 400 ends. Because the write operation is lost, data $508_1$ may be written to storage system 116, but is not written to file 112.

At step 414, write to journal 308 of metadata $502_1$ and checksum $504_1$ completes. Following the above example, metadata $502_1$ is written to slot $310_1$ and checksum $504_1$ is written to slot $310_2$, as shown in FIG. 5A. It should be noted that although write of data $508_1$ to storage 104 is shown in FIG. 4 as completing at step 418, write of data $508_1$ to storage 104 may complete at the same time or before completion of the write at step 414. After the write of metadata $502_1$ and checksum $504_1$ to journal 308 completes, another disruption may occur. Because metadata $502_1$ has been saved to journal 308, the write operation of step 404 may be able to complete despite a disruption that deletes memory 108.

At step 416, file system controller 114 determines whether a disruption has occurred. If a disruption has occurred, method 400 continues to step 422. If a disruption has not occurred, method 400 continues to step 418.

At step 418, write of data $508_1$ to storage 104 completes. As stated above, write of data to storage $508_1$ may complete at any point of method 400 between step 408 and step 418, and not necessarily at step 418.

At step 420, file system 420 updates metadata within inode 202 and pointer block(s) 204 of file 112 in view of metadata $502_1$. For example, from the mapping of offset of file 112 and file data block(s) to which data $508_1$ was written, file system controller 114 may change or add pointers within pointer block 204 to point to new file data block(s) 206 to which data $508_1$ was written. If the number of file data blocks 206 of file 112 increased, file system controller 114 may update a size indicator within inode 202 to indicate that the size of file 112 has increased as a result of the write of data $508_1$ to file 112 within storage 104. One example of a size indicator of file 112 is a count of blocks 206 that have been allocated to file 112. After step 420, method 400 ends.

At step 422, file system controller 114 compares (a) checksum $504_1$ to (b) recomputed checksum of file data blocks 206 to which data $508_1$ was written. Step 422 is reached after a disruption is determined to have occurred at step 416. The write of data $508_1$ that began at step 408 may have completed despite the disruption. As part of step 422, file system controller 114 accesses file data blocks 206 of file 112 to which data $508_1$ was intended to be written. File system controller 114 determines which file data blocks 206 data $508_1$ was intended to be written by referencing metadata $502_1$ stored within journal 308. File system controller 114 determines which portions of file data blocks 206 were intended to hold data $508_1$, such as by referencing a size indicator (e.g., a multiplier) of data $508_1$ stored within metadata $502_1$, and by referencing the mapping stored within metadata $502_1$. File system controller 114 then computes a checksum of these portions, such as by the method of computing a checksum described below with reference to FIG. 6 and FIG. 7. File system controller 114 compares (a) the computed checksum of portions of file data block(s) 206, to (b) checksum $504_1$ stored within journal 308. If the checksums match, then the writing of data $508_1$ from memory 108 to file data block(s) 206 of storage 104 successfully completed before the crash determined at step 416. If the checksums match, then method 400 continues to step 420, described above. If the checksums do not match, then the writing of data $508_1$ from memory 108 did not successfully complete before the crash determined at 416. If the checksums do not match, then method 400 continues to step 424.

At step 424, file system controller 114 determines whether data $508_1$ is recoverable, so as to begin another try of write of data $508_1$ to storage 104. Data $508_1$ may be recoverable if, for example, memory 108 was not deleted as a result of the crash, and data $508_1$ remains within memory 108, available to be written to storage 114. Data $508_1$ may be recoverable if, for example, memory 108 was not deleted as a result of the crash, but a location identifier of data $508_1$ within a non-volatile storage (not shown) is stored within metadata $502_1$, allowing file system controller 114 to recover data $508_1$ from the non-volatile storage. Data $508_1$ may be unrecoverable if, for example, memory 108 is deleted as a result of the disruption of step 416, and a location of data $508_1$ within a non-volatile storage is not ascertainable from metadata $502_1$ or from other data. If data $508_1$ is recoverable, method 400 continues to step 426. If data $508_1$ is not recoverable, then method 400 ends. In an embodiment, if method 400 ends at step 424, then file system controller 114 discards metadata $502_1$ from its slot within journal 308.

At step 426, file system controller 114 recovers data $508_1$ and begins to write data $508_1$ to file data block(s) 206. Step 426 is similar to step 408. If needed, as part of step 426, file system controller 114 transfers recovered data $508_1$ to memory 108 before starting to write data $508_1$ to storage 104.

Figure 5B:
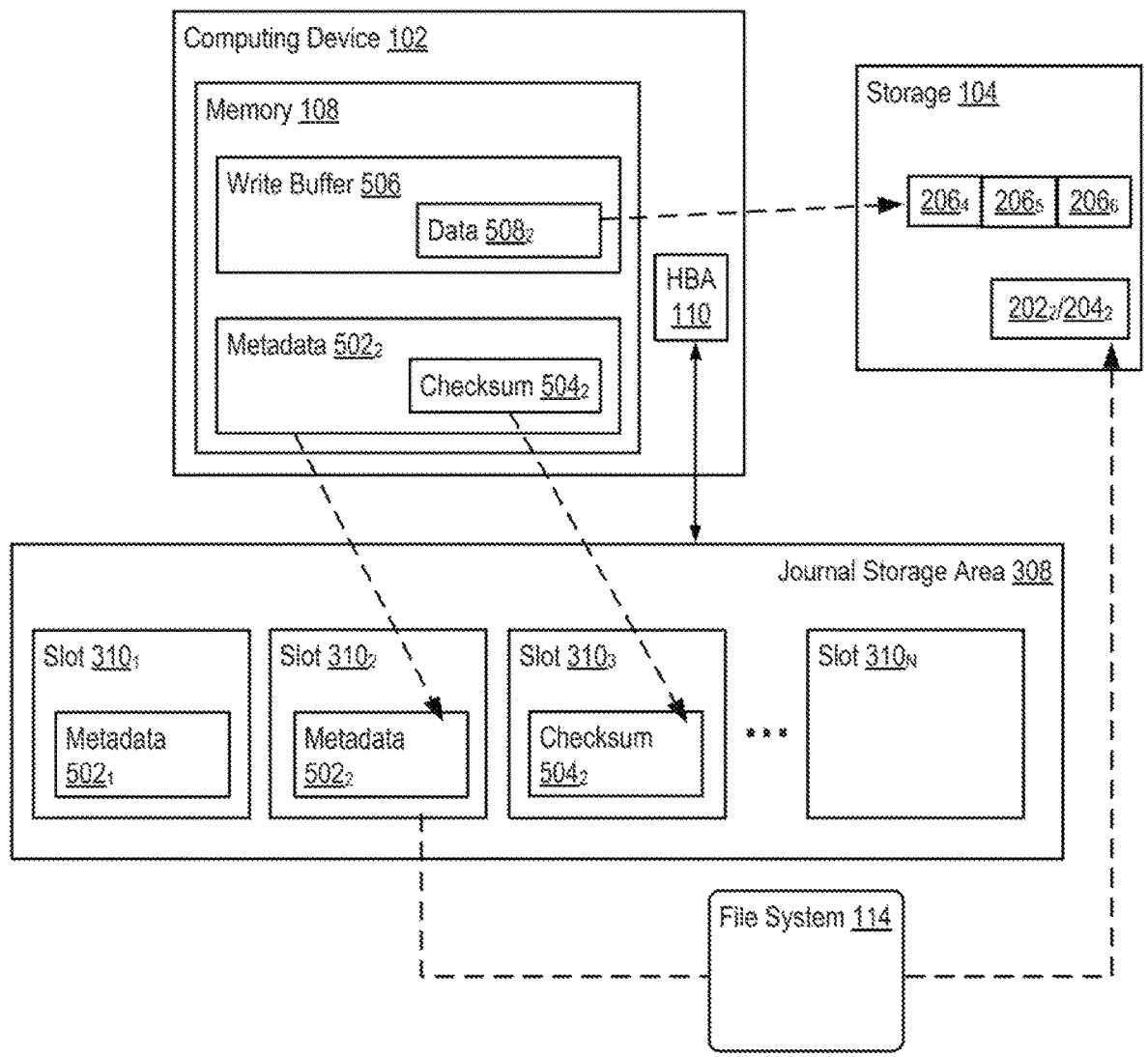
FIG. 5B depicts a block diagram of a flow of data and metadata of a second write to storage, according to an embodiment.

FIG. 5B depicts a block diagram of a flow of data $508_1$ and metadata $502_1$ of a second write to storage 104, according to an embodiment. FIG. 5B serves to further explain the functions of journal 308. Specifically, FIG. 5B helps to illustrate step 406 of method 400, but for a subsequent execution of the exemplary execution of step 406 described above with reference to FIG. 4. FIG. 5B depicts a "second" write to storage 104, while FIG. 5A depicts a "first" write to storage 104.

Above, for the first write to storage 104 described with reference to FIG. 1A, metadata $502_1$ was written to slot $310_1$ and checksum $504_1$ was written to slot $310_2$, as shown in FIG. 5A. Slot $310_1$ was the "active" or "designated" slot of journal 308. For the subsequent second write occurring, the active slot shifts, for example, by one slot, and the active slot becomes $310_2$. For the second write, metadata $502_2$ is written into active slot $310_2$, overwriting checksum $504_1$ of the first write. Checksum $504_2$ is then written into slot $310_3$, which is adjacent and immediately after active slot $310_2$. Every subsequent write operation (i.e., instance of method 400), the active slot shifts.

Figure 6:
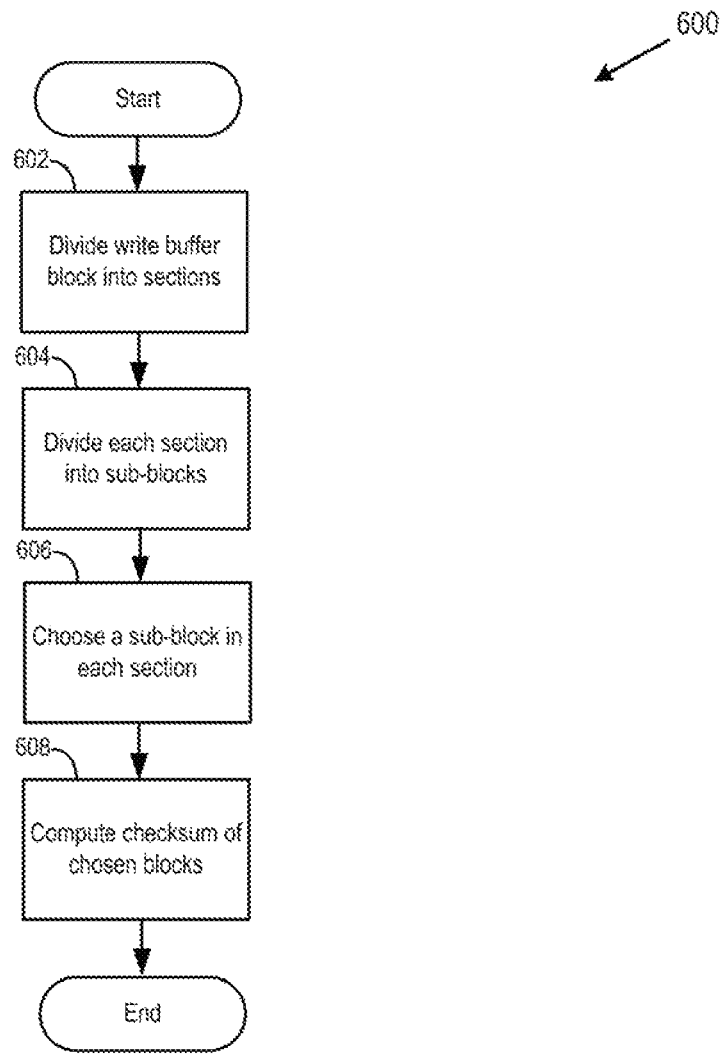
FIG. 6 depicts a flow diagram of a method of calculating a checksum, according to an embodiment.
Figure 7:
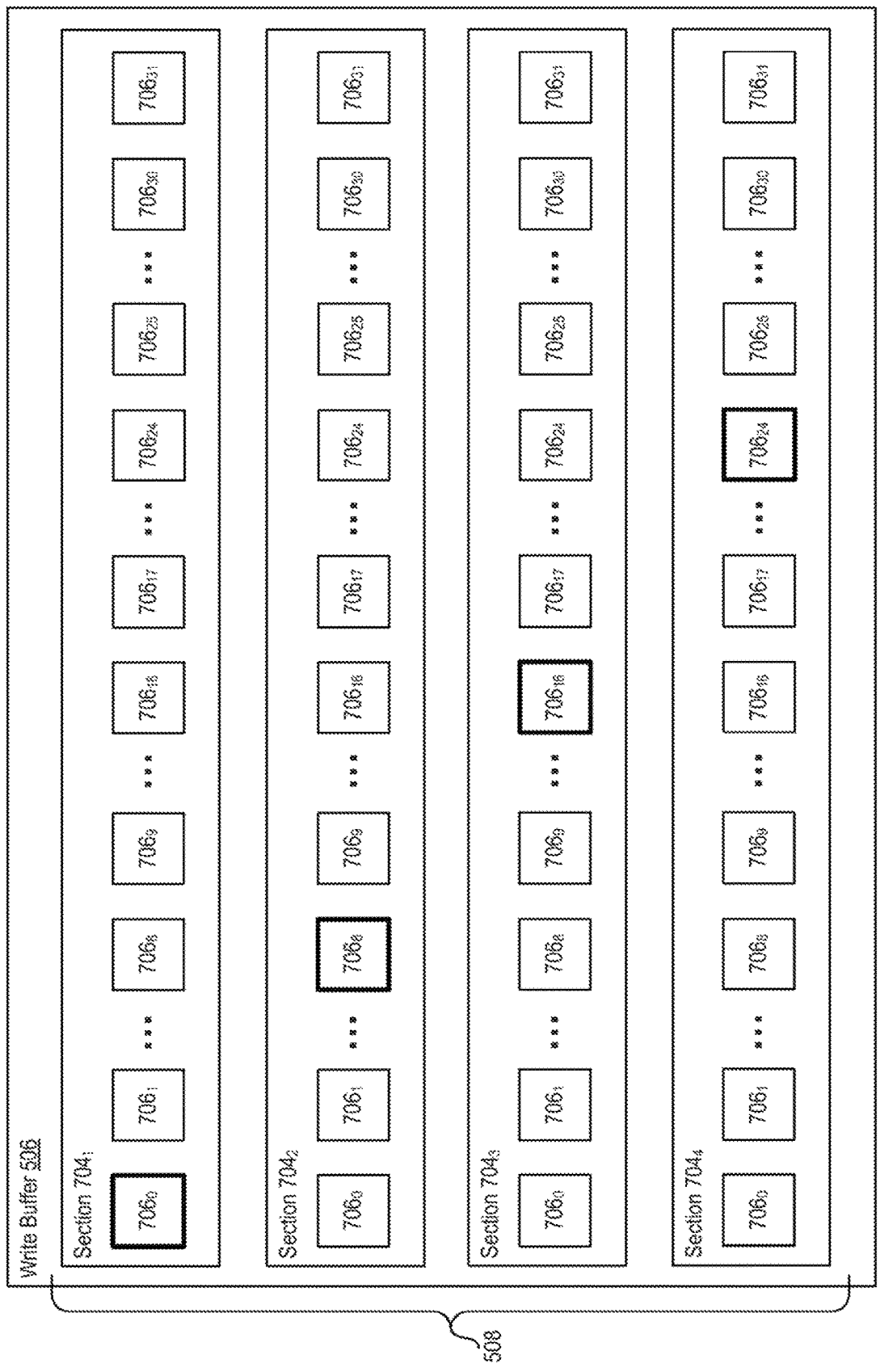
FIG. 7 depicts a block diagram of an exemplary write buffer containing data to be written, according to an embodiment.

FIG. 6 depicts a flow diagram of a method 600 of calculating a checksum, according to an embodiment. Method 600 may be triggered within steps of method 400, such as steps 402 and 422 within which a checksum is calculated. Method 600 may be performed by computing device 102 or file system controller 114. Although method 600 is described with reference to write buffer 506, the same method 600 may be performed on one or more file data blocks 206 containing data 508 (either data $508_1$ of FIG. 5A or data $508_2$ of FIG. 5B), or method 600 may be performed on a portion of file data blocks 206 containing data 508. Method 600 is described along with FIG. 7, in order to illustrate the steps of method 600. FIG. 7 depicts a block diagram of an exemplary write buffer 506 containing data 508, according to an embodiment.

At step 602 of method 600, write buffer 506 and data 508 are divided into several sections 704, such as for example, four sections $704_1$-$704_4$. Size of each section 704 may vary. Write buffer 506 and data 508 may be, for example, 4096 bytes (4 KB) in size. Each section may be of equal size, such as 1024 bytes (1 KB) in size.

At step 604, each section is divided into several sub-blocks 706. For example, write buffer 506 may contain thirty-two sub-blocks $706_0$-$706_{31}$ in each section 704, each sub-block 706 being, for example, 32 bytes in size.

At step 606, at least one sub-block 706 is chosen in each section 706. The selections of sub-blocks 706 may be chosen based on which slot 308 is currently the "active" slot storing metadata 502 that is associated with checksum 504 being computed by method 600. For example, sub-block $706_0$ may be chosen in section $704_1$, sub-block $706_8$ may be chosen in section $704_2$, sub-block $706_16$ may be chosen on section $704_3$, and sub-block $706_{24}$ may be chosen in section $704_4$. In an embodiment, the last sub-block $706_{31}$ of the last section $704_4$ of the write buffer is always also chosen. Inclusion of the last sub-block $706_{31}$ is to ensure that the last of data 508 is included within the calculation of the checksum, to ensure that the last of data 508 has been written to storage 104 when checksums are compared in step 422 of method 400.

At step 608, checksum (e.g., checksum 504) of the chosen sub-blocks 706 is computed, the chosen sub-blocks 706 having been chosen at step 606. The checksum of the chosen sub-blocks 706 is the result of entering the chosen sub-blocks 706 as input to a checksum algorithm. The input, consisting of the chosen blocks, may be an ordered arrangement of the chosen sub-blocks.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of performing a write operation to a file of a storage system, the storage system comprising one or more storage devices comprising a journaling portion that is divided into a plurality of slots, the write operation comprising an indicator of data to be written, the file comprising a file data portion and a file metadata portion, the method comprising:
    receiving, by the storage system, a command to perform the write operation;
    performing, in parallel:
        (a) a write of first metadata and a write of a first checksum of at least a portion of the data to be written, the write of the first metadata being to a first slot of the journaling portion of the one or more storage devices, the write of the first checksum being to a second slot of the journaling portion of the one or more storage devices, wherein the first slot and the second slot are located adjacent to one another, and
        (b) a write of the data to be written, the write of the data to be written being to the file data portion of the file; and
    upon completion of both the write of the first metadata and the write of the data to be written, modifying metadata of the file in the file metadata portion based on the first metadata stored within the journaling portion of the one or more storage devices.

2. The method of claim 1, the method further comprising, prior to the modifying of the metadata of the file:
    computing a second checksum of at least some of data written to the file data portion of the file;
    comparing the first checksum to the second checksum; and
    based on the comparison, (a) performing the modifying of the metadata of the file, if the checksums match, or (b) determining whether the data to be written is recoverable, if the checksums do not match.

3. The method of claim 1, the method further comprising:
    determining whether a disruption of the write operation has occurred;
    based on the determining of whether a disruption of the write operation has occurred, determining whether the first metadata is recoverable; and
    based on the determining of whether the first metadata is recoverable, (a) performing a second write of the first metadata to the journaling portion of the one or more storage devices, if the first metadata is recoverable, or (b) not performing the second write, if the first metadata is not recoverable.

4. The method of claim 1, the method further comprising computing the first checksum, wherein the computing the first checksum comprises:
    dividing a write buffer into a plurality of sections;
    dividing each section into a plurality of sub-blocks;
    choosing at least one sub-block in each section; and
    computing the first checksum by using a checksum algorithm, wherein the input to the checksum algorithm comprises the chosen at least one sub-blocks from each section.

5. The method of claim 1, wherein the write of the first metadata and the write of the first checksum are performed in parallel.

6. The method of claim 1, wherein the write of the first metadata and the write of the first checksum are performed in series.

7. The method of claim 1, wherein the file comprises an inode and one or more pointer blocks, wherein the file metadata comprises a plurality of pointers, further wherein the inode comprises at least some of the file metadata, and further wherein the one or more pointer blocks comprise the plurality of pointers.

8. A non-transitory computer readable medium comprising instructions to be executed in a processor of a computer system, the instructions when executed in the processor cause the computer system to carry out a method of performing a write operation to a file of a storage system, the storage system comprising one or more storage devices comprising a journaling portion that is divided into a plurality of slots, the write operation comprising an indicator of data to be written, the file comprising a file data portion and a file metadata portion, the method comprising:
    receiving, by the storage system, a command to perform the write operation;
    performing, in parallel:
        (a) a write of first metadata and a write of a first checksum of at least a portion of the data to be written, the write of the first metadata being to a first slot of the journaling portion of the one or more storage devices, the write of the first checksum being to a second slot of the journaling portion of the one or more storage devices, wherein the first slot and the second slot are located adjacent to one another, and
        (b) a write of the data to be written, the write of the data to be written being to the file data portion of the file; and
    upon completion of both the write of the first metadata and the write of the data to be written, modifying metadata of the file in the file metadata portion based on the first metadata stored within the journaling portion of the one or more storage devices.

9. The non-transitory computer readable medium of claim 8, the method further comprising, prior to the modifying of the metadata of the file:
    computing a second checksum of at least some of data written to the file data portion of the file;
    comparing the first checksum to the second checksum; and
    based on the comparison, (a) performing the modifying of the metadata of the file, if the checksums match, or (b) determining whether the data to be written is recoverable, if the checksums do not match.

10. The non-transitory computer readable medium of claim 8, the method further comprising:
    determining whether a disruption of the write operation has occurred;
    based on the determining of whether a disruption of the write operation has occurred, determining whether the first metadata is recoverable; and
    based on the determining of whether the first metadata is recoverable, (a) performing a second write of the first metadata to the journaling portion of the one or more storage devices, if the first metadata is recoverable, or (b) not performing the second write, if the first metadata is not recoverable.

11. The non-transitory computer readable medium of claim 8, the method further comprising computing the first checksum, wherein the computing the first checksum comprises:
dividing a write buffer into a plurality of sections;
dividing each section into a plurality of sub-blocks;
choosing at least one sub-block in each section; and
computing the first checksum by using a checksum algorithm, wherein the input to the checksum algorithm comprises the chosen at least one sub-blocks from each section.

12. The non-transitory computer readable medium of claim 11, wherein the write of the first metadata and the write of the first checksum are performed in parallel.

13. The non-transitory computer readable medium of claim 8, wherein the write of the first metadata and the write of the first checksum are performed in series.

14. The non-transitory computer readable medium of claim 8, wherein the file comprises an inode and one or more pointer blocks, wherein the file metadata comprises a plurality of pointers, further wherein the inode comprises at least some of the file metadata, and further wherein the one or more pointer blocks comprise the plurality of pointers.

15. A computer system comprising:
one or more storage devices;
a file comprising a file data portion and a file metadata portion;
a storage system comprising the file and the one or more storage devices, the one or more storage devices comprising a journaling portion that is divided into a plurality of slots;
a processor, wherein the processor is programmed to carry out a method of performing a write operation to the file, the write operation comprising an indicator of data to be written, the method comprising:
receiving, by the storage system, a command to perform the write operation;
performing, in parallel:
(a) a write of first metadata and a write of a first checksum of at least a portion of the data to be written, the write of the first metadata being to a first slot of the journaling portion of the one or more storage devices, the write of the first checksum being to a second slot of the journaling portion of the one or more storage devices, wherein the first slot and the second slot are located adjacent to one another, and
(b) a write of the data to be written, the write of the data to be written being to the file data portion of the file; and
upon completion of both the write of the first metadata and the write of the data to be written, modifying metadata of the file in the file metadata portion based on the first metadata stored within the journaling portion of the one or more storage devices.

16. The computer system of claim 15, the method further comprising:
determining whether a disruption of the write operation has occurred;
based on the determining of whether a disruption of the write operation has occurred, determining whether the first metadata is recoverable; and
based on the determining of whether the first metadata is recoverable, (a) performing a second write of the first metadata to the journaling portion of the one or more storage devices, if the first metadata is recoverable, or (b) not performing the second write, if the first metadata is not recoverable.

17. The computer system of claim 15, the method further comprising, prior to the modifying of the metadata of the file:
computing a second checksum of at least some of data written to the file data portion of the file;
comparing the first checksum to the second checksum; and
based on the comparison, (a) performing the modifying of the metadata of the file, if the checksums match, or (b) determining whether the data to be written is recoverable, if the checksums do not match.

18. The computer system of claim 15, the method further comprising computing the first checksum, wherein the computing the first checksum comprises:
dividing a write buffer into a plurality of sections;
dividing each section into a plurality of sub-blocks;
choosing at least one sub-block in each section; and
computing the first checksum by using a checksum algorithm, wherein the input to the checksum algorithm comprises the chosen at least one sub-blocks from each section.

19. The computer system of claim 18, wherein the write of the first metadata and the write of the first checksum are performed in parallel.

20. The computer system of claim 15, wherein the write of the first metadata and the write of the first checksum are performed in series.

* * * * *